US012699246B2

(12) United States Patent
Kondo et al.

(10) Patent No.: US 12,699,246 B2
(45) Date of Patent: Aug. 4, 2026

(54) LENS DEVICE

(71) Applicant: FUJIFILM Corporation, Tokyo (JP)

(72) Inventors: Nobuyuki Kondo, Saitama (JP);
Mitsuhiko Oka, Saitama (JP); Toshiaki Ezawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 322 days.

(21) Appl. No.: 18/465,998

(22) Filed: Sep. 13, 2023

(65) Prior Publication Data

US 2024/0111119 A1    Apr. 4, 2024

(30) Foreign Application Priority Data

Sep. 29, 2022    (JP) ................................. 2022-157111

(51) Int. Cl.
 *G02B 7/02* (2021.01)
 *G03B 17/12* (2021.01)
(52) U.S. Cl.
 CPC ............. *G02B 7/021* (2013.01); *G03B 17/12* (2013.01)
(58) Field of Classification Search
 CPC ........ G03B 17/14; G03B 21/147; G03B 5/06; G02B 27/648; G02B 27/64; G02B 27/646; G02B 7/021; G02B 7/04; G02B 7/023; G02B 7/10; G02B 7/12; G02B 7/08; G02B 7/105
 See application file for complete search history.

(56) References Cited

U.S. PATENT DOCUMENTS

| | | | | | |
|---|---|---|---|---|---|
| 4,764,068 | A | * | 8/1988 | Crispell | F16B 35/005 |
| | | | | | 411/959 |
| 2022/0269151 | A1 | * | 8/2022 | Chan | G03B 17/561 |
| 2023/0286480 | A1 | * | 9/2023 | Kato | B60T 1/065 |

FOREIGN PATENT DOCUMENTS

| | | | |
|---|---|---|---|
| JP | S4941550 | | 4/1974 |
| JP | S63231007 | | 9/1988 |
| JP | 2010266578 | | 11/2010 |
| JP | 2010266578 A | * | 11/2010 |
| JP | 2017053923 | | 3/2017 |
| JP | 2019040092 | | 3/2019 |

OTHER PUBLICATIONS

"Notice of Reasons for Refusal of Japan Counterpart Application", issued on Apr. 28, 2026, with English translation thereof, p. 1-p. 5.

* cited by examiner

*Primary Examiner* — Ephrem Z Mebrahtu
(74) *Attorney, Agent, or Firm* — JCIPRNET

(57) ABSTRACT

A lens device includes a lens mechanism, a movement mechanism that includes a movement member moving the lens mechanism, and a braking mechanism that generates a braking force with respect to movement of the movement member. The braking mechanism includes a braking member that includes a pressing surface pressing a pressing target surface of the movement member, a support member that supports the braking member, and a pressing member that includes a pressing portion applying a pressing force to a first surface of the braking member. A contact portion between the pressing portion and the first surface is formed at a periphery of a recess portion.

13 Claims, 8 Drawing Sheets

LENS DEVICE

CROSS-REFERENCE TO RELATED APPLICATIONS

This application claims priority under 35 USC 119 from Japanese Patent Application No. 2022-157111 filed on Sep. 29, 2022, the disclosure of which is incorporated by reference herein.

BACKGROUND OF THE INVENTION

1. Field of the Invention

The present disclosed technology relates to a lens device.

2. Description of the Related Art

Disclosed in JP2010-266578A is a lens barrel including a fixation member, a movable member, and a clamping member. The fixation member includes a lens holding portion that holds an optical member and a dovetail groove extending in a direction orthogonal to an optical axis of the optical member. The fixation member can fix any one of a camera body and the lens holding portion. The movable member includes a dovetail tenon that is fitted with a dovetail groove of the fixation member. The other of the camera body and the lens holding portion can be attached to the movable member and the movable member is movable relative to the fixation member. The clamping member is supported to be rotatable relative to the movable member and a portion of the clamping member comes into contact with the fixation member so that a frictional force is generated and the movable member is fixed to the fixation member. A rotation axis of the clamping member is parallel with a direction in which the dovetail groove of the fixation member extends and the rotation axis is between the point of action of the clamping member to the fixation member and the point of effort at the time of driving the clamping member.

Disclosed in JP2017-053923A is an optical device including a base member and a shift member. The shift member holds a lens and is movable relative to the base member in a direction orthogonal to an optical axis. One of the shift member and the base member includes a first contact portion and includes a retaining portion that is elastically deformable. The other of the shift member or the base member includes a second contact portion that comes into contact with the first contact portion to restrict the shift member from moving relative to the base member in an optical axis direction. The length of an overlap between the first contact portion and the second contact portion in the direction orthogonal to the optical axis is larger than the maximum amount by which the shift member can be driven relative to the base member in a direction in which the length of the overlap is reduced.

Disclosed in JP2019-040092A is a lens barrel including a lens holding member, a guide member, and a cam member. The lens holding member holds a lens and is movable along an optical axis of the lens. The guide member supports the lens holding member. The cam member is rotatable around the optical axis. The guide member includes a linear groove that guides movement of the lens holding member in an optical axis direction. The cam member includes a cam groove for movement of the lens holding member in the optical axis direction. The lens holding member includes a plurality of first roller members and a plurality of second roller members. At least one of the plurality of first roller members engages with the linear groove and the cam groove. The plurality of second roller members are in the same phases as the plurality of first roller members in a circumferential direction of the lens holding member respectively and are provided at positions separated from the plurality first roller members in the optical axis direction. The diameter of one of the plurality of second roller members that is provided in the same phase as at least one first roller member is smaller than the diameter of the at least one first roller member.

SUMMARY OF THE INVENTION

One embodiment according to the present disclosed technology provides a lens device in which a braking force can be stably exerted in comparison with a structure in which a pressing portion applies a pressing force to a first surface of a braking member on a central axis of a pressing member.

A lens device according to a first aspect of the present disclosed technology comprises a lens mechanism, a movement mechanism that includes a movement member moving the lens mechanism, and a braking mechanism that generates a braking force with respect to movement of the movement member. The braking mechanism includes a braking member that includes a pressing surface pressing a pressing target surface of the movement member, a support member that supports the braking member, and a pressing member that includes a pressing portion applying a pressing force to a first surface of the braking member, and a contact portion between the pressing portion and the first surface is formed at a periphery of a recess portion.

According to a second aspect of the present disclosed technology, in the lens device related to the first aspect, the pressing portion and the first surface may come into line-contact with each other at the contact portion.

According to a third aspect of the present disclosed technology, in the lens device related to the first aspect, the pressing target surface and the pressing surface may be inclined surfaces that are inclined with respect to a direction orthogonal to an axial direction of the pressing member.

According to a fourth aspect of the present disclosed technology, in the lens device related to the first aspect, the pressing member may include the recess portion, the recess portion includes an opening that is at a tip portion of the pressing member, and the pressing portion is formed at a peripheral edge portion of the opening.

According to a fifth aspect of the present disclosed technology, in the lens device related to the fourth aspect, the pressing member may include a body portion, and a diameter increase portion that is formed at an end portion of the body portion that is on a braking member side and of which a diameter is larger than a diameter of the body portion, the recess portion may include an effective hole diameter portion that defines an effective hole diameter of the recess portion, and the effective hole diameter portion may be formed to be closer to a tip portion side of the pressing member than a boundary between the body portion and the diameter increase portion is.

According to a sixth aspect of the present disclosed technology, in the lens device related to the fourth aspect, a region of the tip portion of the pressing member, which is around the opening, may be formed to be inclined.

According to a seventh aspect of the present disclosed technology, in the lens device related to the first aspect, the pressing member may be provided with an operation member, the operation member may include a shaft portion and a head portion, and the shaft portion may protrude beyond a side surface of the lens device.

According to an eighth aspect of the present disclosed technology, in the lens device related to the first aspect, the pressing member may be machined through turning.

According to a ninth aspect of the present disclosed technology, in the lens device related to the third aspect, an inclined angle of the inclined surfaces may be 30° to 60°.

According to a tenth aspect of the present disclosed technology, in the lens device related to the first aspect, an end portion of the braking member that is on a pressing surface side may be formed at an angle different from an angle at which the pressing surface is formed.

According to an eleventh aspect of the present disclosed technology, in the lens device related to the first aspect, a surface roughness of the pressing surface may be larger than a surface roughness of a surface of the braking member other than the pressing surface.

According to a twelfth aspect of the present disclosed technology, in the lens device related to the first aspect, the movement mechanism may be a shift mechanism that shifts the lens mechanism.

According to a thirteenth aspect of the present disclosed technology, the lens device related to the first aspect may further include a tilt mechanism that tilts the lens mechanism, a shift mechanism that shifts the lens mechanism, and a rotation mechanism that rotates at least one of the tilt mechanism or the shift mechanism around an optical axis direction.

A lens device according to a fourteenth aspect of the present disclosed technology comprises a lens mechanism, a movement mechanism that includes a movement member moving the lens mechanism, and a braking mechanism that generates a braking force with respect to movement of the movement member. The braking mechanism includes a braking member that includes a pressing surface pressing a pressing target surface of the movement member, a support member that supports the braking member, and a pressing member that includes a pressing portion applying a pressing force to a first surface of the braking member, and a contact portion between the pressing portion and the first surface is formed to be separated from a central axis of the pressing member.

DESCRIPTION OF THE PREFERRED
EMBODIMENTS

In the description of the present specification, the meaning of "being orthogonal" includes not only "being completely orthogonal" but also "being orthogonal with an error generally acceptable in a technical field to which the present disclosed technology belongs to an extent that is not inconsistent with the gist of the present disclosed technology". In the description of the present specification, the meaning of "being parallel with each other" includes not only "being completely parallel with each other" but also "being parallel with each other with an error generally acceptable in a technical field to which the present disclosed technology belongs to an extent that is not inconsistent with the gist of the present disclosed technology". In the description of the present specification, the meaning of "being at equal intervals" includes not only "being at equal intervals" but also "being at equal intervals with an error generally acceptable in a technical field to which the present disclosed technology belongs to an extent that is not inconsistent with the gist of the present disclosed technology".

First, the configuration of an imaging apparatus 10 according to an embodiment of the present disclosure will be described.

Figure 1:
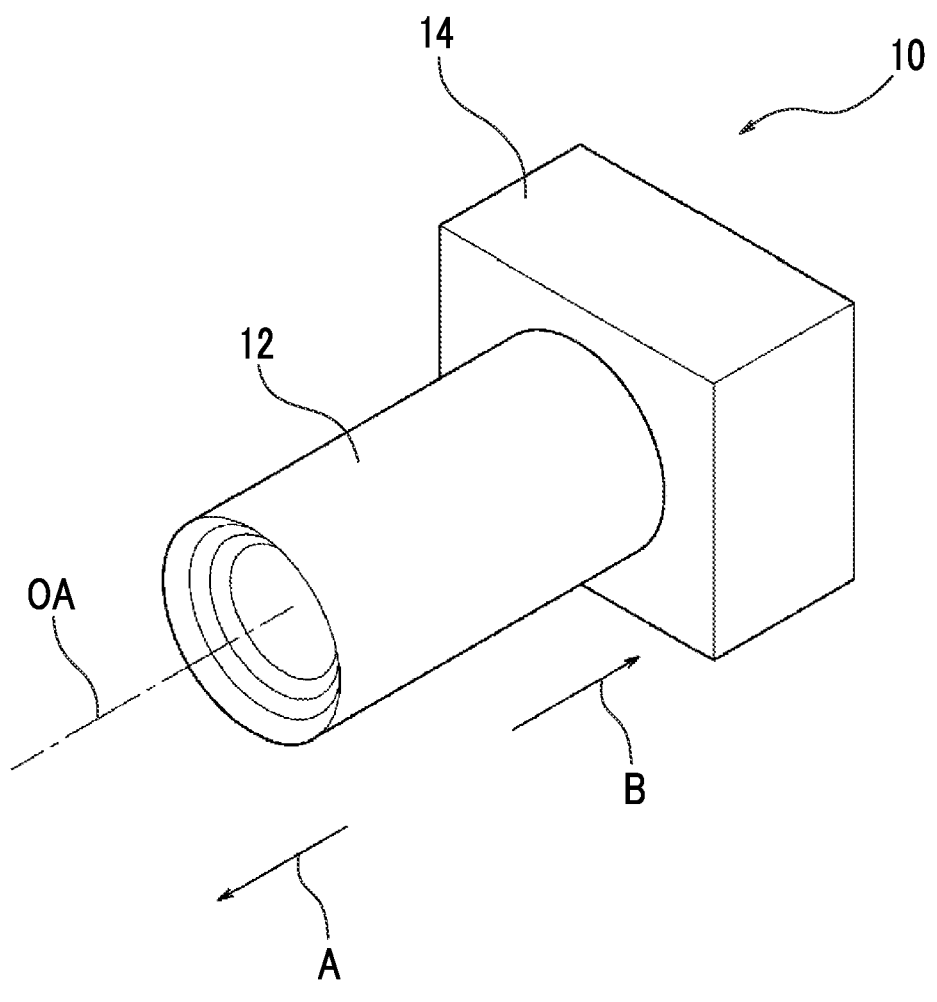
FIG. 1 is a perspective view showing an example of an imaging apparatus.

FIG. 1 shows a perspective view of the imaging apparatus 10 according to the present embodiment. For example, the imaging apparatus 10 includes a lens device 12 and an imaging apparatus body 14 as shown in FIG. 1. The lens device 12 is provided at a front portion of the imaging apparatus body 14. In FIG. 1, the lens device 12 and the imaging apparatus body 14 are schematically shown. An image sensor (not shown), a computer (not shown), and the like are built into the imaging apparatus body 14. Regarding the lens device 12, an arrow A side is an object side, and an arrow B side is an image formation side. An optical axis OA is an optical axis of the lens device 12. Hereinafter, an axial direction along the optical axis OA will be referred to as an "optical axis direction".

Figure 2:
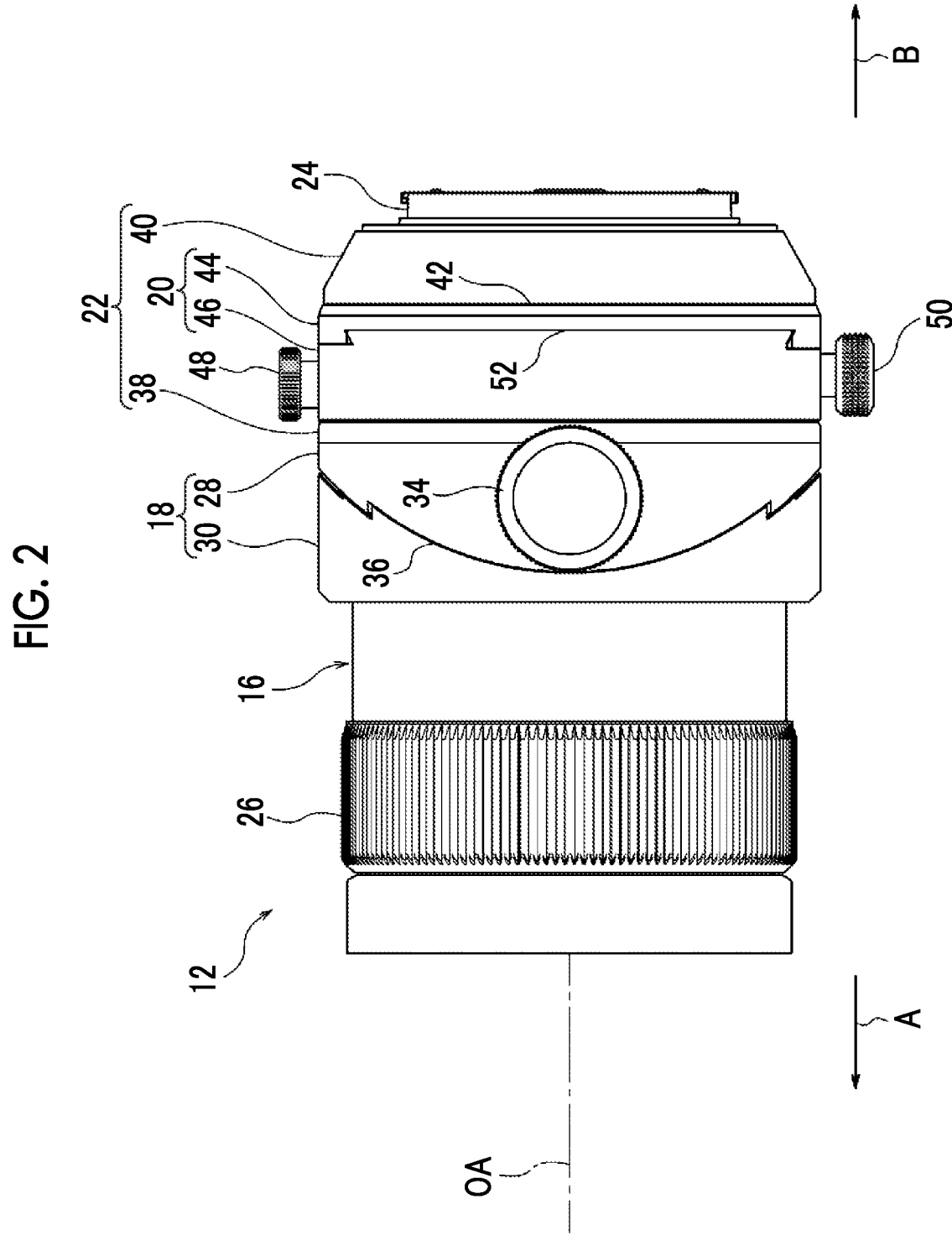
FIG. 2 is a plan view showing an example of a lens device.
Figure 3:
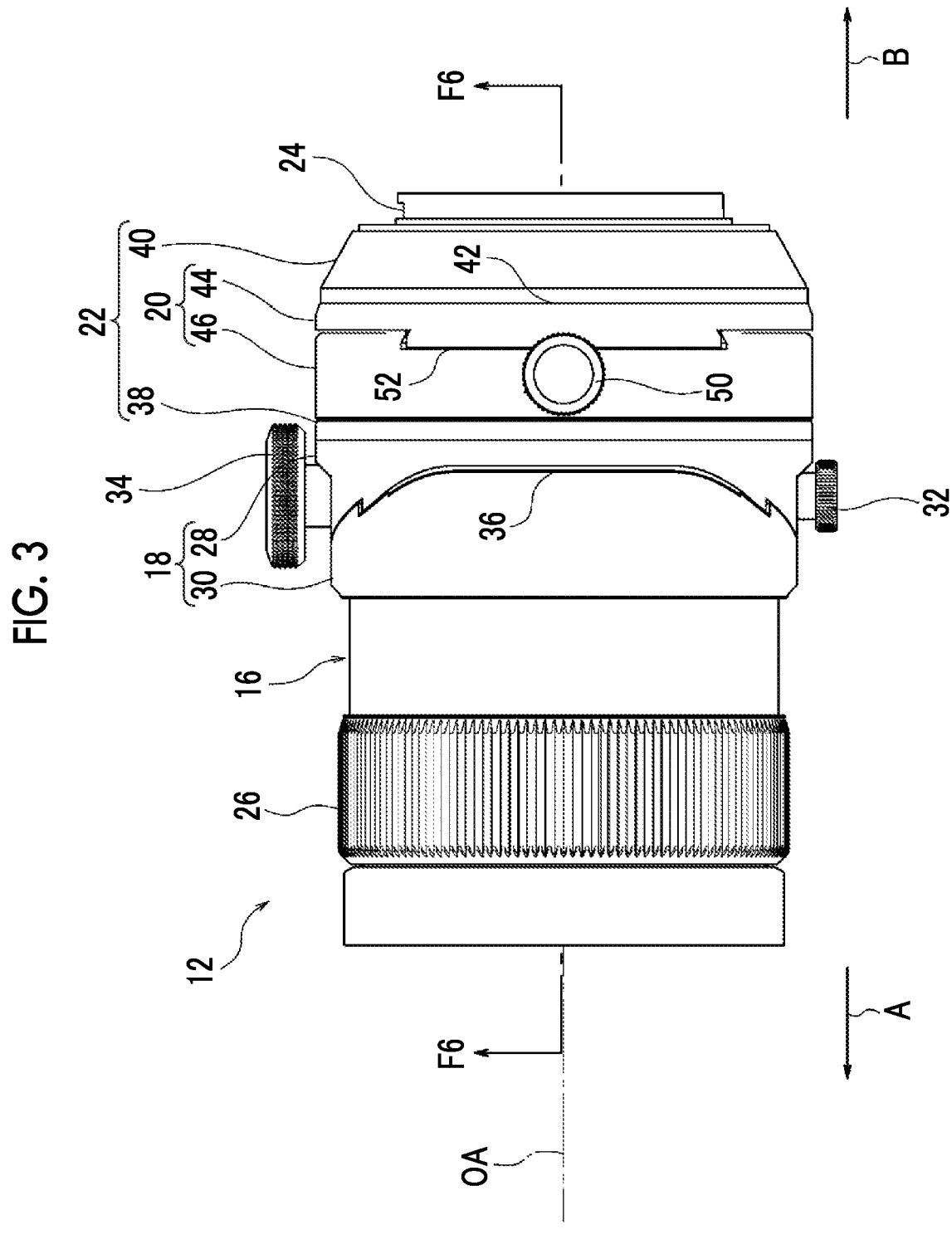
FIG. 3 is a side view showing an example of the lens device.
Figure 4:
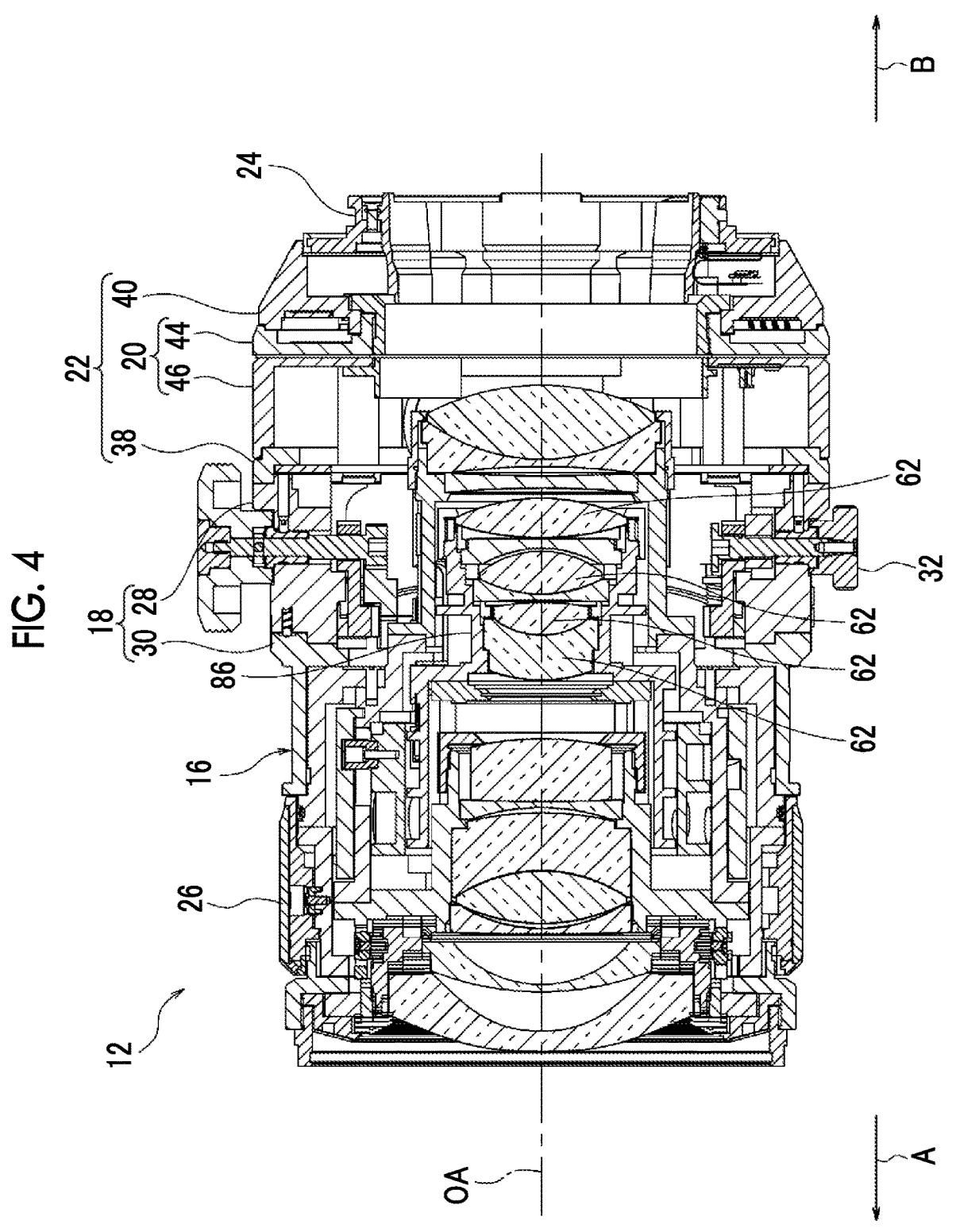
FIG. 4 is a longitudinal cross-sectional view showing an example of the lens device.

FIG. 2 shows a plan view of the lens device 12 and FIG. 3 shows a side view of the lens device 12. In addition, FIG. 4 shows a longitudinal cross-sectional view (that is, a cross-sectional side view) of the lens device 12. For example, as shown in FIGS. 2 to 4, the lens device 12 includes a lens mechanism 16, a tilt mechanism 18, a shift mechanism 20, a revolving mechanism 22, and a mount 24.

The lens mechanism 16 includes a focus ring 26. The focus ring 26 is formed around the optical axis direction in a ring-like shape. The focus ring 26 can rotate around the optical axis direction.

The tilt mechanism 18 is a mechanism that tilts the lens mechanism 16. The tilt mechanism 18 includes a tilt base 28, a tilt stage 30, a tilt lock 32, and a tilt knob 34. A boundary 36 is a boundary between the tilt base 28 and the tilt stage 30. The boundary 36 is formed in an arc-like shape while being centered on a tilt shaft (not shown) orthogonal to the optical axis OA. The tilt mechanism 18 acts with the boundary 36 as a starting point.

The tilt stage 30 is disposed closer to the object side than the tilt base 28 is. The tilt stage 30 is fixed to the lens mechanism 16. The tilt base 28 supports the tilt stage 30 such that the tilt stage 30 can tilt. The meaning of "to tilt" is an operation of rotating about the tilt shaft. The tilt stage 30 tilts integrally with the lens mechanism 16.

The tilt lock 32 and the tilt knob 34 are shaft-shaped members. The tilt lock 32 is disposed with an axial direction of the tilt lock 32 being parallel with an axial direction of the tilt shaft. Similarly, the tilt knob 34 is disposed with an axial direction of the tilt knob 34 being parallel with the axial direction of the tilt shaft. The tilt lock 32 and the tilt knob 34 are provided at the tilt base 28.

The tilt lock 32 is a member that can switch between a locking state in which the tilt stage 30 is fixed to the tilt base 28 and an unlocking state in which the tilt stage 30 is allowed to tilt. The tilt knob 34 is a member that tilts the tilt stage 30. For example, a rack-and-pinion mechanism (not shown) is provided between the tilt knob 34 and the tilt stage 30 and the tilt stage 30 tilts by an amount corresponding to the amount of rotation of the tilt knob 34.

The revolving mechanism 22 is a mechanism that rotates the lens mechanism 16, the tilt mechanism 18, and the shift mechanism 20. The revolving mechanism 22 includes a revolving stage 38 and a revolving base 40. A boundary 42 is a boundary between the revolving base 40 and a shift base 44 which will be described later. The boundary 42 is formed along a plane orthogonal to the optical axis OA. The revolving mechanism 22 acts with the boundary 42 as a starting point.

The revolving stage 38 is disposed closer to the image formation side than the tilt base 28 is. The revolving stage 38 is fixed to the tilt base 28. The revolving base 40 is disposed closer to the image formation side than the shift base 44 is. The revolving base 40 supports the shift base 44 to be rotatable around the optical axis direction. The lens mechanism 16, the tilt mechanism 18, the revolving stage 38, and the shift mechanism 20 integrally rotate with each other around the optical axis direction. The lens mechanism 16, the tilt mechanism 18, the revolving stage 38, and the shift mechanism 20 rotate in a case where a force in a rotation direction is applied by a user or the like. The revolving mechanism 22 is an example of a "rotation mechanism" according to an embodiment of the present disclosed technology.

The shift mechanism 20 is a mechanism that shifts the lens mechanism 16 and the tilt mechanism 18. The shift mechanism 20 includes the shift base 44, a shift stage 46, a shift lock 48, and a shift knob 50. A boundary 52 is a boundary between the shift base 44 and the shift stage 46. The boundary 52 is formed along a plane orthogonal to the optical axis OA. The shift mechanism 20 acts with the boundary 52 as a starting point.

The shift stage 46 is disposed closer to the image formation side than the revolving stage 38 is. The shift stage 46 is fixed to the revolving stage 38. The shift base 44 is disposed closer to the image formation side than the shift stage 46 is. The shift base 44 supports the shift stage 46 such that the shift stage 46 can shift. The meaning of "to shift" is an operation of sliding in a direction orthogonal to the optical axis direction. The shift stage 46 integrally shifts with the lens mechanism 16, the tilt mechanism 18, and the revolving stage 38. For example, a direction in which the shift stage 46 shifts (hereinafter, referred to as a "shift direction") is set to a vertical direction of the imaging apparatus 10 (refer to FIG. 1).

The shift lock 48 and the shift knob 50 are shaft-shaped members. The shift lock 48 is disposed with an axial direction of the shift lock 48 being parallel with a direction orthogonal to the optical axis direction and the shift direction. Similarly, the shift knob 50 is disposed with an axial direction of the shift knob 50 being parallel with the direction orthogonal to the optical axis direction and the shift direction. The shift lock 48 and the shift knob 50 are provided at the shift stage 46.

The shift lock 48 is a member that can switch between a locking state in which the shift stage 46 is fixed to the shift base 44 and an unlocking state in which the shift stage 46 is allowed to shift. The shift knob 50 is a member that shifts the shift stage 46. For example, a rack-and-pinion mechanism (not shown) is provided between the shift knob 50 and the shift base 44 and the shift stage 46 shifts by an amount corresponding to the amount of rotation of the shift knob 50. The shift mechanism 20 is an example of a "moving mechanism" according to an embodiment of the present disclosed technology.

Note that the shift lock 48 constitutes a portion of a braking mechanism 100 (refer to FIG. 6) which will be described later. In the lens mechanism 16, a braking force with respect to movement of the shift stage 46 can be adjusted in accordance with a fastening amount of the shift lock 48.

The mount 24 is provided at an end portion of the lens mechanism 16 that is on the image formation side. The mount 24 is fixed to the revolving base 40. The mount 24 is attached to a mount (not shown) provided on the imaging apparatus body 14 (refer to FIG. 1). The lens device 12 is fixed to the front portion of the imaging apparatus body 14 in a case where the mount 24 is fixed to the mount provided on the imaging apparatus body 14.

Figure 5:
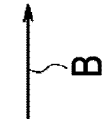
FIG. 5 is a longitudinal cross-sectional view showing an example of a lens mechanism.

FIG. 5 shows a longitudinal cross-sectional view of the lens mechanism 16. For example, as shown in FIG. 5, the lens mechanism 16 includes first lenses 60, second lenses 62, third lenses 64, a first lens frame 66, a second lens frame 68, a third lens frame 70, a movement frame 72, a fixation member 74, a cam tube 76, a rotary tube 78, and a focus ring 26.

For example, the first lenses 60 are objective lenses, the second lenses 62 are focus lenses, and the third lenses 64 are fixed focal lenses. The first lenses 60 are disposed closer to the object side than the second lenses 62 are and the third lenses 64 are disposed closer to the image formation side than the second lenses 62 are.

The first lenses 60 are disposed inside the first lens frame 66, the second lenses 62 are disposed inside the second lens frame 68, and the third lenses 64 are disposed inside the third lens frame 70. In the present specification, the term "inside" means "inside in a radial direction" unless there is no description in which a direction is specified. The first lens frame 66 holds the first lenses 60, the second lens frame 68 holds the second lenses 62, and the third lens frame 70 holds the third lenses 64. The second lens frame 68 is an example of a "lens holding member" according to an embodiment of the present disclosed technology.

The first lens frame 66 includes a first frame 80 and a second frame 82. The first frame 80 is provided closer to the object side than the second frame 82 is. Lenses 60A, which are part of the first lenses 60 and are positioned on the object side, are disposed inside the first frame 80 and lenses 60B, which is part of the first lenses 60 and are positioned on the image formation side, are disposed inside the second frame 82.

The second lens frame 68 includes a third frame 84 and a fourth frame 86. The third frame 84 is provided closer to the object side than the fourth frame 86 is. The second lenses 62 are disposed inside the fourth frame 86. The second lenses 62 and the fourth frame 86 are disposed inside the tilt mechanism 18, the shift mechanism 20, and the revolving mechanism 22 (refer to FIG. 4).

The third frame 84 is disposed closer to the object side than the second lenses 62 are. In addition, the third frame 84 is disposed outside the second frame 82 of the first lens frame 66. In the present specification, the term "outside" means "outside in the radial direction" unless there is no description in which a direction is specified. The lenses 60B, which are part of the first lenses 60 and are positioned on the image formation side, are disposed inside the third frame 84.

The movement frame 72 is connected to an outer side of the third frame 84. The movement frame 72 is formed of, for example, a resin. The fixation member 74 includes a fixation frame 88 and a connection frame 90. The fixation frame 88 is provided closer to the object side than the connection frame 90 is. The fixation frame 88 is disposed outside the movement frame 72. The third lens frame 70 is fixed to an end portion of the connection frame 90 that is on the image formation side. The fourth frame 86 and the second lenses 62 are disposed inside the connection frame 90. The fixation member 74 is fixed to the first lens frame 66.

The cam tube 76 is disposed outside the movement frame 72 and the fixation frame 88. The rotary tube 78 is connected to an outer side of the cam tube 76 and the focus ring 26 is connected to an outer side of the rotary tube 78.

The focus ring 26, the rotary tube 78, and the cam tube 76 are supported to be rotatable around the optical axis direction with respect to the fixation member 74. In addition, the movement frame 72 and the second lens frame 68 are supported to be movable in the optical axis direction with respect to the fixation member 74.

The movement frame 72 is provided with cam shafts 92. The cam shafts 92 are shaft-shaped members extending from the movement frame 72 toward the cam tube 76. The fixation frame 88 is provided between the movement frame 72 and the cam tube 76. The cam shafts 92 penetrate the fixation frame 88 and protrude toward the cam tube 76 side with respect to the fixation frame 88. Cam grooves 94 are formed at a surface (that is, an inner peripheral surface) of the cam tube 76 that is on the fixation frame 88 side. The cam grooves 94 are formed along a spiral extending in the optical axis direction. The cam shafts 92 are engaged with the cam grooves 94.

The cam shafts 92 and the cam grooves 94 form cam mechanisms 96 that convert a force acting around the optical axis direction into a force in the optical axis direction. In a case where the focus ring 26 is operated in the rotation direction by a user or the like, the cam shafts 92 move along the cam grooves 94 as the focus ring 26 and the cam tube 76 rotate, so that the movement frame 72 and the second lens frame 68 move in the optical axis direction.

Note that although one cam mechanism 96 is shown in FIG. 5, the lens device 12 is provided with three cam mechanisms 96. That is, the number of a plurality of the cam shafts 92 is three. The three cam shafts 92 are disposed around the optical axis direction at equal intervals. The cam grooves 94 of the three cam mechanisms 96 may be independent of each other or may be connected to each other.

Figure 6:
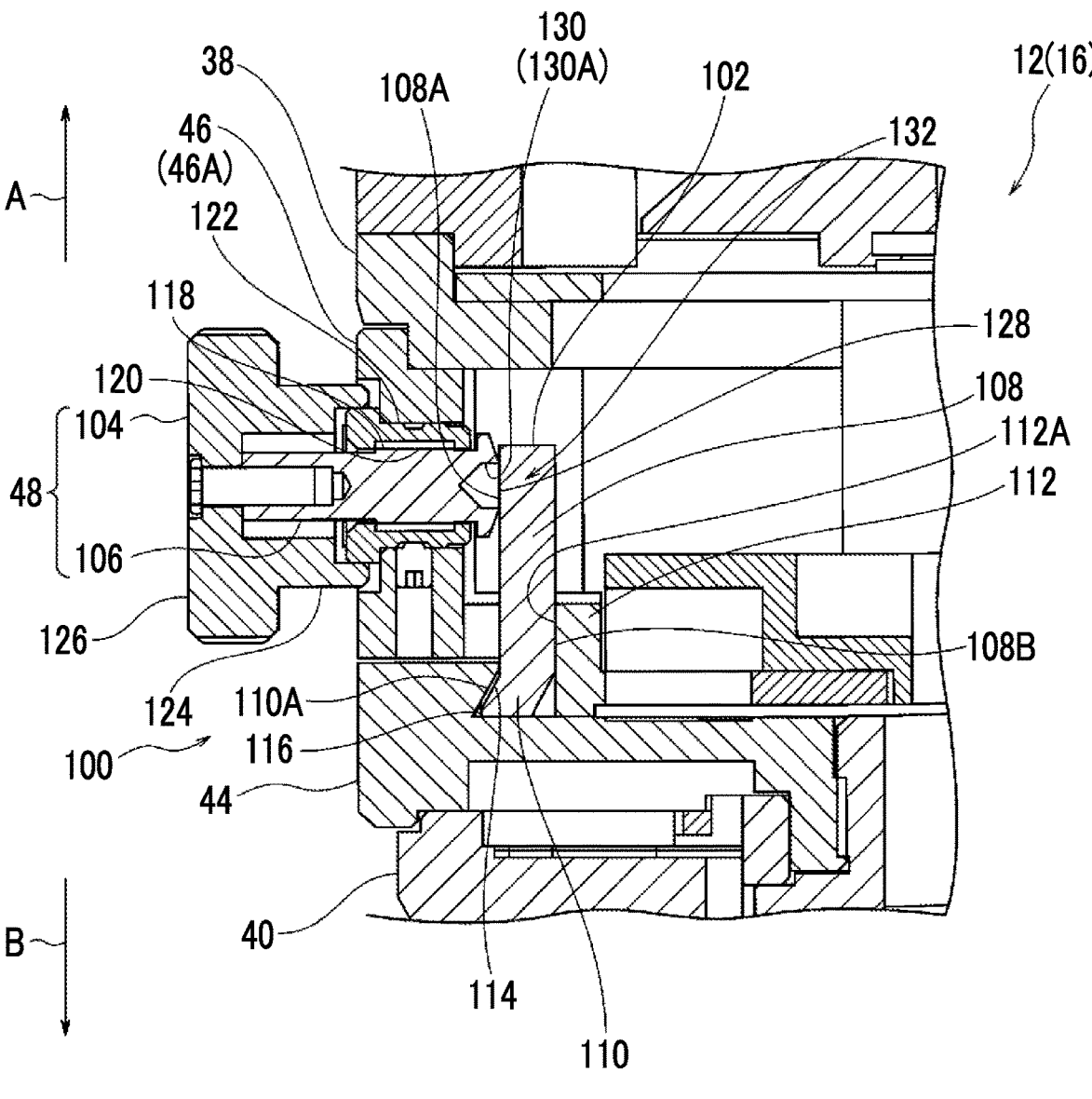
FIG. 6 is a cross-sectional view of an example of a braking mechanism which is taken along line F6-F6 in FIG. 3.
Figure 7:
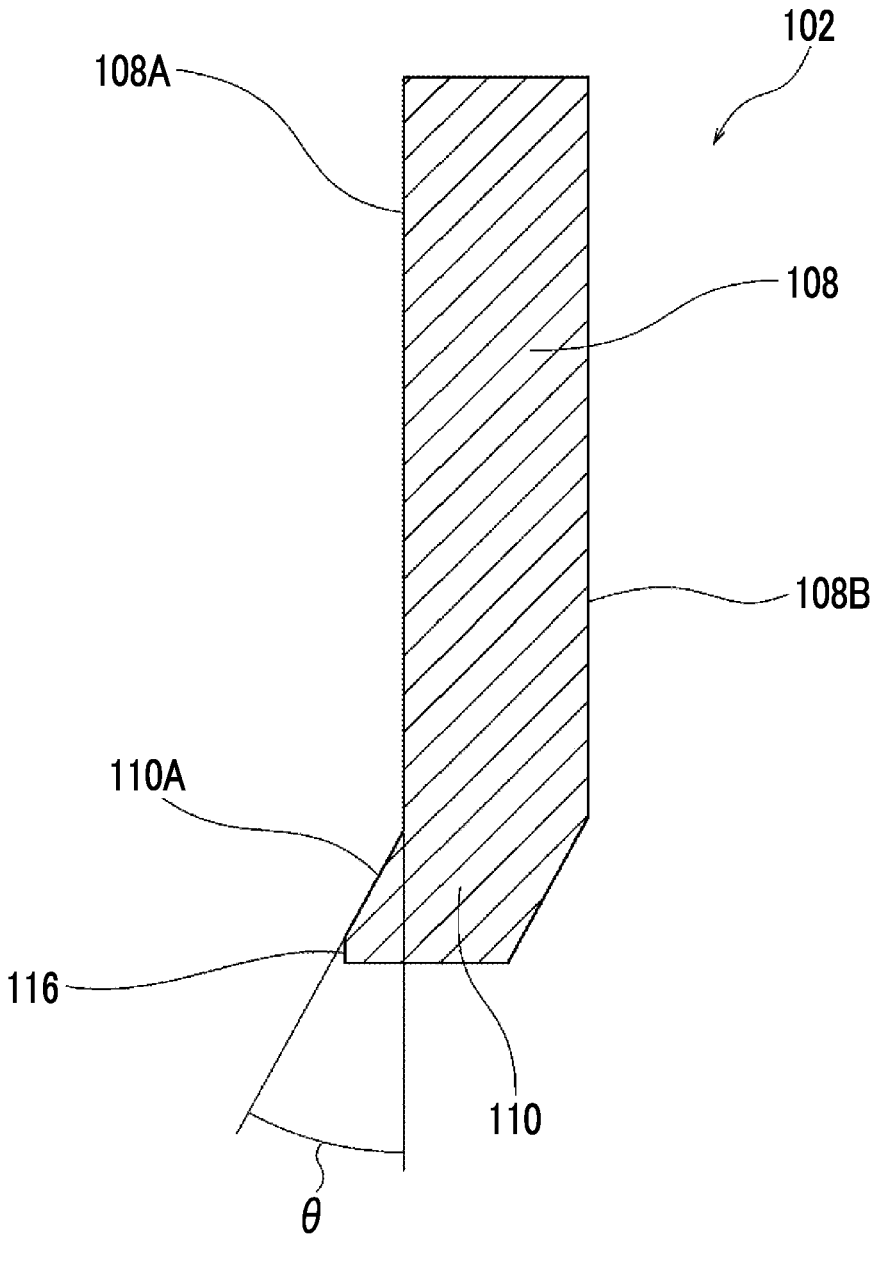
FIG. 7 is a cross-sectional view showing an example of a braking member.

FIG. 6 shows a cross-sectional view of the braking mechanism 100 which is taken along line F6-F6 in FIG. 3. FIG. 7 shows a cross-sectional view of a braking member 102 which corresponds to FIG. 6 and FIG. 8 shows a cross-sectional view of a shaft member 106 of the shift lock 48 which corresponds to FIG. 6.

Figure 8:
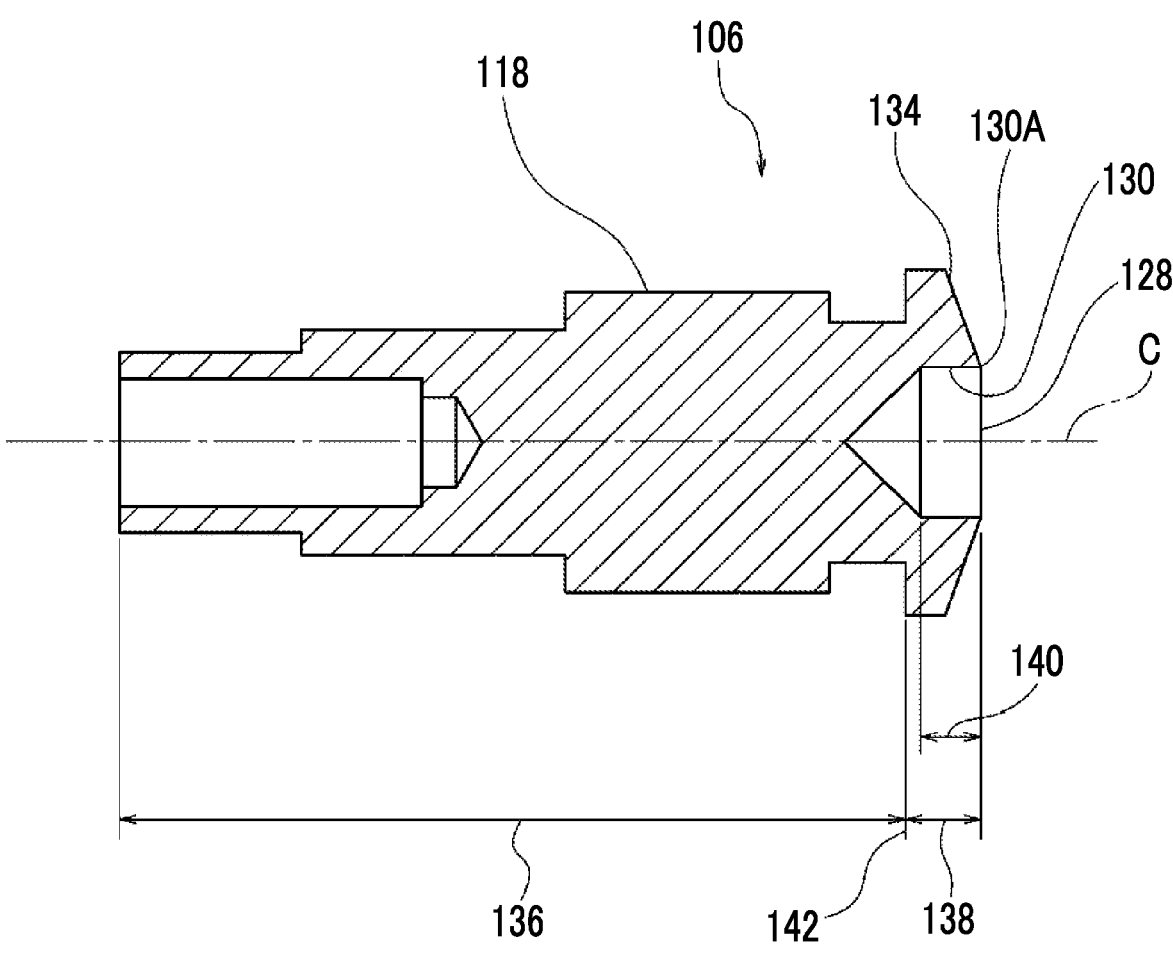
FIG. 8 is a cross-sectional view showing an example of a shaft member of a shift lock.

For example, as shown in FIGS. 6 and 8, the braking mechanism 100 is a mechanism that generates a braking force with respect to movement of the shift stage 46. The braking mechanism 100 includes the braking member 102, the shift lock 48, the shift stage 46, and the shift base 44. The shift lock 48 includes an operation knob 104 and the shaft member 106. The shaft member 106 extends in the radial direction of the lens mechanism 16. The operation knob 104 is provided on a side opposite to the braking member 102 with respect to the shaft member 106.

The shaft member 106 is an example of a "pressing member" according to an embodiment of the present disclosed technology. The operation knob 104 is an example of an "operation member" according to an embodiment of the present disclosed technology. The shift stage 46 is an example of a "movement member" and a "support member" according to an embodiment of the present disclosed technology.

The braking member 102 includes a body portion 108 that extends in a direction orthogonal to an axial direction of the shaft member 106 and an inclined portion 110 that is inclined with respect to the body portion 108. The direction orthogonal to the axial direction of the shaft member 106 corresponds to an axial direction of the lens mechanism 16. A support portion 112 is formed at the shift stage 46, and the body portion 108 is disposed between the shaft member 106 and the support portion 112.

The body portion 108 includes a first surface 108A that faces a tip portion of the shaft member 106 and a second surface 108B that faces the support portion 112. The first surface 108A is a surface that faces the outside of the lens mechanism 16, and the second surface 108B is a surface that faces the inside of the lens mechanism 16.

The support portion 112 includes a support surface 112A that faces the outside of the lens mechanism 16. The first surface 108A, the second surface 108B, and the support surface 112A are surfaces extending in a direction orthogonal to the axial direction of the shaft member 106. The tip portion of the shaft member 106 is in contact with the first surface 108A and the second surface 108B is supported by the support surface 112A.

The inclined portion 110 is provided closer to the image formation side than the body portion 108 is. The inclined portion 110 is inclined to become closer to the outside of the lens mechanism 16 toward the image formation side. The inclined portion 110 includes a pressing surface 110A facing a pressing target surface 114 formed at the shift base 44. The pressing surface 110A and the pressing target surface 114 are inclined surfaces that are inclined with respect to the direction orthogonal to the axial direction of the shaft member 106. The pressing surface 110A and the pressing target surface 114 are inclined to become closer to the outside of the lens mechanism 16 toward the image formation side. An inclined angle $\theta$ of the pressing surface 110A and the pressing target surface 114 is set to, for example, 30° to 60°. The pressing surface 110A is a surface that presses the pressing target surface 114.

The surface roughness of the pressing surface 110A is larger than the surface roughness of surfaces of the braking member 102 other than the pressing surface 110A. For example, shot blasting or the like is performed on the pressing surface 110A so that the surface roughness of the pressing surface 110A is set.

An end portion 116 of the braking member 102 that is on the pressing surface 110A side is formed at an angle different from an angle at which the pressing surface 110A is formed. Accordingly, the end portion 116 is formed as a clearance portion that is apart (that is, separated) from the pressing target surface 114 with an interval provided therebetween.

The shaft member 106 is obtained through turning. That is, the shaft member 106 is machined through turning. The shaft member 106 is formed of, for example, metal. A screw 118 is formed on the shaft member 106, and the shift stage 46 is provided with a nut 122 including a screw hole 120. The screw 118 is screwed into the screw hole 120.

The operation knob 104 includes a shaft portion 124 and a head portion 126 of which the diameter is larger than that of the shaft portion 124. The shaft portion 124 protrudes beyond a side surface of the lens device 12 (specifically, an outer peripheral surface 46A of the shift stage 46) and the head portion 126 is disposed at a position at which the head portion 126 is separated from the outer peripheral surface 46A of the shift stage 46 while being on the outside of the lens mechanism 16.

At the tip portion of the shaft member 106, a pressing portion 128 that applies a pressing force to the first surface 108A of the braking member 102 is formed. The pressing portion 128 comes into contact with the first surface 108A. The shaft member 106 includes a recess portion 130. The recess portion 130 is a hollow portion including an opening 130A that is open at the tip portion of the shaft member 106. The pressing portion 128 is formed at a periphery of the recess portion 130 (specifically, at a peripheral edge portion of the opening 130A). As described above, a contact portion 132 between the pressing portion 128 and the first surface 108A is formed at the periphery of the recess portion 130.

Since the pressing portion 128 is formed at the peripheral edge portion of the opening 130A, the pressing portion 128 is in line-contact with the first surface 108A at the contact portion 132. In addition, the pressing portion 128 is formed to be separated from a central axis C of the shaft member 106 by being formed at the peripheral edge portion of the opening 130A. For example, the pressing portion 128 is formed in an annular shape along the peripheral edge portion of the opening 130A. A region 134 of the tip portion of the shaft member 106, which is around the opening 130A, is formed to be inclined. For example, the region 134 is formed in a tapered shape of which the diameter increases toward the outside of the lens mechanism 16.

The shaft member 106 includes a body portion 136 and a diameter increase portion 138. The diameter increase portion 138 is formed at an end portion of the body portion 136 that is on the braking member 102 side. The diameter increase portion 138 has a diameter larger than that of the body portion 136. The recess portion 130 includes an effective hole diameter portion 140 that defines an effective hole diameter of the recess portion 130. The effective hole diameter portion 140 is a portion at which the hole diameter of the recess portion 130 is constant. A portion of the recess portion 130 that is closer to a bottom side than the effective hole diameter portion 140 is is formed in a tapered shape. The effective hole diameter portion 140 is closer to a tip portion side of the shaft member 106 than a boundary 142 between the body portion 136 and the diameter increase portion 138 is.

In addition, in the braking mechanism 100, in a case where the first surface 108A of the braking member 102 is pressed by the pressing portion 128, the pressing surface 110A of the braking member 102 presses the pressing target surface 114 of the shift base 44 with the second surface 108B supported by the support surface 112A as a fulcrum because of the principle of leverage. Accordingly, a braking force acts with respect to movement of the shift stage 46. In addition, with the fastening amount of the shift lock 48 being adjusted, the pressing force of the pressing surface 110A with respect to the pressing target surface 114 is adjusted in accordance with the fastening amount and the braking force with respect to the movement of the shift stage 46 is adjusted.

Next, the effects of the present embodiment will be described.

First, in order to clarify the effects of the present embodiment, a comparative example will be described. Examples of the comparative example include, with respect to the above-described structure in the present embodiment, a structure in which the pressing portion 128 applies a pressing force to the first surface 108A of the braking member 102 on the central axis C of the shaft member 106. However, in a case where the shaft member 106 is formed through turning, a protrusion-like uncut portion is generally formed at the center of the pressing portion 128.

Therefore, in the case of the structure in which the pressing portion 128 applies the pressing force to the first surface 108A of the braking member 102 on the central axis C of the shaft member 106, the protrusion-like uncut portion applies the pressing force to the first surface 108A. That is, the pressing portion 128 applies the pressing force to the first surface 108A in a state where the protrusion-like uncut portion is in point-contact with the first surface 108A. Therefore, the state of contact between the pressing portion 128 and the first surface 108A is unstable in comparison with a case where the pressing portion 128 comes into surface-contact with the first surface 108A and thus a braking force with respect to movement of the shift stage 46 may also be unstable.

However, in the braking mechanism 100 according to the present embodiment, the contact portion 132 between the pressing portion 128 and the first surface 108A is formed at the periphery of the recess portion 130. Therefore, even in a case where the shaft member 106 is subject to turning, it is possible to prevent the protrusion-like uncut portion from being formed on the center of the pressing portion 128 and the pressing portion 128 can apply a pressing force to the first surface 108A at the periphery of the recess portion 130. Accordingly, the state of contact between the pressing portion 128 and the first surface 108A is made stable and a braking force with respect to movement of the shift stage 46 can be stably exerted in comparison with the structure of the comparative example.

In addition, at the contact portion 132, the pressing portion 128 and the first surface 108A come into line-contact with each other. Accordingly, the state of contact between the pressing portion 128 and the first surface 108A can be made stable in comparison with a case where the pressing portion 128 and the first surface 108A come into point-contact with each other.

In addition, the shaft member 106 includes the recess portion 130 including the opening 130A that is at the tip portion of the shaft member 106 and the pressing portion 128 is formed at the peripheral edge portion of the opening 130A. Accordingly, it is possible to prevent a protrusion-like uncut portion from being formed on the center of the pressing portion 128 and the pressing portion 128 can apply a pressing force to the first surface 108A at the periphery of the recess portion 130.

In addition, the contact portion 132 between the pressing portion 128 and the first surface 108A is formed to be separated from the central axis C of the shaft member 106. Therefore, the pressing portion 128 can apply a pressing force to the first surface 108A at the periphery of the recess portion 130 separated from the central axis C of the shaft member 106.

In addition, the region 134 of the tip portion of the shaft member 106, which is around the opening 130A, is formed to be inclined. Therefore, it is possible to suppress interference between the region 134 around the opening 130A and the first surface 108A. Accordingly, the state of contact between the pressing portion 128 and the first surface 108A can be made stable in comparison with a case where the region 134 around the opening 130A and the first surface 108A are formed to be parallel with each other, for example.

In addition, the shaft member 106 is machined through turning. Therefore, the shaft member 106 can be manufactured at a low cost and the degree of freedom in the shape of the shaft member 106 can be increased in comparison with a case where the shaft member 106 is manufactured through casting, for example.

In addition, the shaft member 106 includes the body portion 136 and the diameter increase portion 138. The diameter increase portion 138 is formed at an end portion of the body portion 136 that is on the braking member 102 side and the diameter of the diameter increase portion 138 is larger than the diameter of the body portion 136. The recess portion 130 includes the effective hole diameter portion 140 that defines the effective hole diameter of the recess portion 130 and the effective hole diameter portion 140 is formed to be closer to the tip portion side of the shaft member 106 than the boundary 142 between the body portion 136 and the diameter increase portion 138 is. Therefore, for example, the stiffness of the tip portion side of the shaft member 106 can be secured in comparison with a case where the effective hole diameter portion 140 is formed up to a position that is closer to a bottom side of the recess portion 130 than the boundary 142 is. Accordingly, it is possible to improve the efficiency of transmission of a pressing force from the pressing portion 128 to the first surface 108A.

In addition, the shaft member 106 is provided with the operation knob 104. The operation knob 104 includes the shaft portion 124 and the head portion 126 and the shaft portion 124 protrudes beyond the side surface (specifically, the outer peripheral surface 46A of the shift stage 46) of the lens device 12. Therefore, the head portion 126 can be disposed at a position separated from the outer peripheral surface 46A of the shift stage 46 while being on the outside of the lens mechanism 16. Accordingly, it is possible to restrain a foreign substance or the like from being sandwiched between the head portion 126 and the outer peripheral surface 46A of the shift stage 46 in comparison with a case where the shaft portion 124 is disposed closer to the inside of the lens mechanism 16 than the outer peripheral surface 46A of the shift stage 46 is, for example.

In addition, the pressing target surface 114 and the pressing surface 110A are inclined surfaces that are inclined with respect to the direction orthogonal to the axial direction of the shaft member 106. Therefore, the area of contact between the pressing target surface 114 and the pressing surface 110A can be increased in comparison with a case where the pressing target surface 114 and the pressing surface 110A extend in the direction orthogonal to the axial direction of the shaft member 106, for example.

In addition, the inclined angle θ of the pressing target surface 114 and the pressing surface 110A is 30° to 60°. Therefore, the area of contact between the pressing target surface 114 and the pressing surface 110A can be increased in comparison with a case where the inclined angle θ is smaller than 30°, for example. In addition, it is possible to improve the efficiency of transmission of a pressing force from the pressing surface 110A to the pressing target surface 114 in comparison with a case where the inclined angle θ is greater than 60°.

In addition, the end portion 116 of the braking member 102 that is on the pressing surface 110A side is formed at an angle different from an angle at which the pressing surface 110A is formed. Therefore, since the end portion 116 is formed as a clearance portion that is apart (that is, separated) from the pressing target surface 114 with an interval provided therebetween, interference between the end portion 116 and the pressing target surface 114 can be suppressed in comparison with a case where the end portion 116 is formed at the same angle as an angle at which the pressing surface 110A is formed, for example. Accordingly, the state of contact between the pressing surface 110A and the pressing target surface 114 can be made stable.

In addition, the surface roughness of the pressing surface 110A is larger than the surface roughness of surfaces of the braking member 102 other than the pressing surface 110A. Therefore, a braking force with respect to movement of the shift stage 46 can be increased in comparison with a case where the surface roughness of the pressing surface 110A is the same as the surface roughness of the surfaces of the braking member 102 other than the pressing surface 110A, for example.

In addition, the braking mechanism 100 is a braking mechanism with respect to the shift mechanism 20 that shifts the lens mechanism 16. Therefore, a braking force with respect to movement of the shift stage 46 can be exerted in a case where the shift stage 46 is moved relative to the shift base 44.

In addition, the lens device 12 includes the lens mechanism 16, the tilt mechanism 18 that tilts the lens mechanism 16, and the shift mechanism 20 that shifts the lens mechanism 16. Therefore, it is possible to perform a tilt imaging operation which is an imaging operation performed in a state where the lens mechanism 16 is tilted by the tilt mechanism 18 and a shift imaging operation which is an imaging operation performed in a state where the shift mechanism 20 is shifted by the shift mechanism 20.

In addition, the lens device 12 includes the revolving mechanism 22 that rotates the tilt mechanism 18 and the shift mechanism 20 around the optical axis direction. Therefore, it is possible to change a direction in which the lens mechanism 16 is tilted by rotating the tilt mechanism 18 with the revolving mechanism 22. In addition, it is possible to change a direction in which the lens mechanism 16 is shifted by rotating the shift mechanism 20 with the revolving mechanism 22.

Next, modification examples of the present embodiment will be described.

In the above-described embodiment, the recess portion 130 is formed at the shaft member 106. However, the recess portion 130 may be formed at the braking member 102. In addition, the opening 130A of the recess portion 130 may be open at the first surface 108A of the braking member 102. In addition, the recess portion 130 may be formed at both of the shaft member 106 and the braking member 102. Even in the case of such a configuration, since the contact portion 132 between the pressing portion 128 and the first surface 108A is formed at the periphery of the recess portion 130, the state of contact between the pressing portion 128 and the first surface 108A is made stable and a braking force with respect to movement of the shift stage 46 can be stably exerted in comparison with the structure of the comparative example.

In addition, in the above-described embodiment, the end portion 116 of the braking member 102 that is on the pressing surface 110A side is formed at an angle different from an angle at which the pressing surface 110A is formed and is formed as a clearance portion. However, for example, the end portion 116 may be formed as a clearance portion by being formed by a curved surface (that is, formed to have an R-like shape).

In addition, in the above-described embodiment, the revolving mechanism 22 is a mechanism that rotates the tilt mechanism 18 and the shift mechanism 20 around the optical axis direction. However, the revolving mechanism 22 may be a mechanism that rotates any one of the tilt mechanism 18 or the shift mechanism 20 around the optical axis direction.

In addition, in the above-described embodiment, the lens device 12 includes the tilt mechanism 18, the shift mechanism 20, and the revolving mechanism 22. However, at least one of the tilt mechanism 18, the shift mechanism 20, or the revolving mechanism 22 may be omitted.

Contents described and illustrated above are for detailed description of a part according to the present disclosed technology and are merely an example of the present disclosed technology. For example, description of the above-described configurations, functions, actions, and effects is description related to an example of configurations, functions, actions, and effects of a part according to the present disclosed technology. Therefore, it is a matter of course that an unnecessary part of the contents described and illustrated above may be deleted, a new element may be added, and replacement may be made without departing from the spirit of the present disclosed technology. In addition, in order to avoid complication and facilitate the understanding of a portion according to the present disclosed technology, regarding the contents described and illustrated above, description related to common technical knowledge or the like which does not need to be described to enable implementation of the present disclosed technology has been omitted.

All publications, patent applications, and technical standards described in the present specification are incorporated herein by reference to the same extent as if each publication, patent application, or technical standard was specifically and individually indicated to be incorporated by reference.

What is claimed is:

1. A lens device comprising:
a lens mechanism;
a movement mechanism that includes a movement member moving the lens mechanism; and
a braking mechanism that generates a braking force with respect to movement of the movement member,
wherein the braking mechanism includes
    a braking member that includes a pressing surface pressing a pressing target surface of the movement member,
    a support member that supports the braking member, and
    a pressing member that includes a pressing portion applying a pressing force to a first surface of the braking member, and
a contact portion between the pressing portion and the first surface is formed at a periphery of a recess portion,
wherein an end portion of the braking member that is on a pressing surface side is formed by a line and is formed at an angle different from an angle at which the pressing surface is formed, when being viewed in a direction orthogonal to an axial direction of the pressing member and an axial direction of the lens mechanism.

2. The lens device according to claim 1,
wherein the pressing portion and the first surface come into line-contact with each other at the contact portion.

3. The lens device according to claim 1,
wherein the pressing target surface and the pressing surface are inclined surfaces that are inclined with respect to a direction orthogonal to an axial direction of the pressing member.

4. The lens device according to claim 1,
wherein the pressing member includes the recess portion,
the recess portion includes an opening that is at a tip portion of the pressing member, and
the pressing portion is formed at a peripheral edge portion of the opening.

5. The lens device according to claim 4,
wherein the pressing member includes
    a body portion, and
    a diameter increase portion that is formed at an end portion of the body portion that is on a braking member side and of which a diameter is larger than a diameter of the body portion,
the recess portion includes an effective hole diameter portion that defines an effective hole diameter of the recess portion, and
the effective hole diameter portion is formed to be closer to a tip portion side of the pressing member than a boundary between the body portion and the diameter increase portion is.

6. The lens device according to claim 4,
wherein a region of the tip portion of the pressing member, which is around the opening, is formed to be inclined.

7. The lens device according to claim 1,
wherein the pressing member is provided with an operation member,
the operation member includes a shaft portion and a head portion, and
the shaft portion protrudes beyond a side surface of the lens device.

8. The lens device according to claim 1,
wherein the pressing member is machined through turning.

9. The lens device according to claim 3,
wherein an inclined angle of the inclined surfaces is 30° to 60°.

10. The lens device according to claim 1,
wherein a surface roughness of the pressing surface is larger than a surface roughness of a surface of the braking member other than the pressing surface.

11. The lens device according to claim 1,
wherein the movement mechanism is a shift mechanism that shifts the lens mechanism.

12. The lens device according to claim 1, further comprising:
a tilt mechanism that tilts the lens mechanism;
a shift mechanism that shifts the lens mechanism; and
a rotation mechanism that rotates at least one of the tilt mechanism or the shift mechanism around an optical axis direction.

13. A lens device comprising:
a lens mechanism;
a movement mechanism that includes a movement member moving the lens mechanism; and
a braking mechanism that generates a braking force with respect to movement of the movement member,
wherein the braking mechanism includes
    a braking member that includes a pressing surface pressing a pressing target surface of the movement member,
    a support member that supports the braking member, and
    a pressing member that includes a pressing portion applying a pressing force to a first surface of the braking member, and
a contact portion between the pressing portion and the first surface is formed to be separated from a central axis of the pressing member,
wherein an end portion of the braking member that is on a pressing surface side is formed by a line and is formed at an angle different from an angle at which the pressing surface is formed, when being viewed in a direction orthogonal to an axial direction of the pressing member and an axial direction of the lens mechanism.

* * * * *